United States Patent
Bigo et al.

(10) Patent No.: US 7,599,628 B2
(45) Date of Patent: Oct. 6, 2009

(54) METHOD FOR MODULATING AN OPTICAL SIGNAL AND OPTICAL TRANSMITTER

(75) Inventors: Sébastien Bigo, Massy (FR); Eric Barnasson, Massy (FR); Gabriel Charlet, Villers-le-Bacle (FR)

(73) Assignee: ALCATEL, Paris (FR)

( * ) Notice: Subject to any disclaimer, the term of this patent is extended or adjusted under 35 U.S.C. 154(b) by 403 days.

(21) Appl. No.: 11/300,474

(22) Filed: Dec. 15, 2005

(65) Prior Publication Data
US 2006/0171723 A1 Aug. 3, 2006

(30) Foreign Application Priority Data
Feb. 1, 2005 (EP) .................................. 05290227

(51) Int. Cl.
*H04B 10/04* (2006.01)

(52) U.S. Cl. .................. 398/183; 398/185; 398/186; 398/188; 359/245; 359/237; 359/238; 359/248

(58) Field of Classification Search .......... 398/182, 398/183, 185, 186, 187, 188, 192, 193, 194, 398/158, 81, 79, 159, 184, 189, 198, 199, 398/200, 201; 359/245, 238, 237, 248
See application file for complete search history.

(56) References Cited

U.S. PATENT DOCUMENTS

| | | | |
|---|---|---|---|
| 5,920,416 A | 7/1999 | Beylat et al. | |
| 6,188,497 B1 | 2/2001 | Franck et al. | |
| 6,693,929 B1 | 2/2004 | Essiambre et al. | |
| 6,721,081 B1 | 4/2004 | Mauro et al. | |
| 6,809,849 B2 * | 10/2004 | Akiyama et al. | 359/237 |
| 6,882,802 B2 * | 4/2005 | Ohhira | 398/188 |
| 7,305,189 B2 * | 12/2007 | Martensson et al. | 398/183 |
| 2002/0005975 A1 | 1/2002 | Nakamoto | |
| 2003/0035185 A1 | 2/2003 | Grandpierre et al. | |
| 2003/0053179 A1 | 3/2003 | Hayee | |
| 2003/0128923 A1 | 7/2003 | Takiguchi et al. | |

(Continued)

FOREIGN PATENT DOCUMENTS

EP 1 059 758 A2 12/2000

(Continued)

OTHER PUBLICATIONS

Hodzic A et al: "Alternative Modulation Formats in N x 40 GB/S WDM Standard Fiber RZ-Transmission Systems" Journal of Lightwave Technology, IEEE. New York, US, vol. 20, No. 4 Apr. 2002, pp. 598-607, XP001130018.

*Primary Examiner*—Hanh Phan
(74) *Attorney, Agent, or Firm*—Sughrue Mion, PLLC

(57) ABSTRACT

A method for modulating an optical signal includes the following steps: modulating the intensity of the optical signal with a nonreturn-to-zero bit signal, and modulating the phase of the optical signal with a periodic phase-shift signal creating an alternating π-phase shift every second, third or more consecutive bit. An optical transmitter for performing the above method comprises a first modulator (2) modulating the intensity of the optical signal with a nonreturn-to-zero bit signal, and a second modulator (3) modulating the phase of the optical signal with a periodic phase-shift signal creating an alternating π-phase shift every second, third or more consecutive bit.

11 Claims, 6 Drawing Sheets

U.S. PATENT DOCUMENTS

| | | |
|---|---|---|
| 2003/0156774 A1 | 8/2003 | Conradi |
| 2003/0175036 A1 | 9/2003 | Mamyshev et al. |
| 2003/0210912 A1 | 11/2003 | Leuthold et al. |
| 2003/0219259 A1 | 11/2003 | Martensson et al. |
| 2004/0076439 A1* | 4/2004 | Lee et al. ............... 398/183 |

FOREIGN PATENT DOCUMENTS

| | | |
|---|---|---|
| EP | 1 462 848 A | 9/2004 |
| WO | WO 01/48955 A2 | 7/2001 |
| WO | WO 03/092237 A1 | 11/2003 |

* cited by examiner

METHOD FOR MODULATING AN OPTICAL SIGNAL AND OPTICAL TRANSMITTER

The invention is based on a priority application EP 05290227.7 which is hereby incorporated by reference.

BACKGROUND OF THE INVENTION

The invention relates to a method for modulating an optical signal and an optical transmitter for performing the method.

Several methods for modulating optical transmission signals are known in the literature. One of the best-known is the nonreturn-to-zero (NRZ) modulation technique represented in FIG. 2. In the NRZ method each logical bit (logical "1"-pulse) is transmitted with a pulse width equal to the full bit period $T=1/B$, where B is the bit-rate at which the pulses are to be transmitted (in bit/s).

FIG. 2a shows an diagram of the intensity (solid line) and phase (dashed line) of a typical NRZ-modulated optical signal of a bit signal of 16 consecutive bits with three pairs of consecutive "1"-bit pulses. The intensity of the optical signal between the two consecutive "1"-pulses of each pair remains constant and does not return to zero. FIG. 2b shows the optical spectrum of the NRZ optical signal of FIG. 2a.

FIG. 2c represents a schematic of the most conventional way of creating a NRZ optical signal: A laser source 1 generates a continuous wave optical signal (carrier signal) which is modulated by an electrical non-return to zero bit signal with bit-rate B in a following first Mach-Zehnder modulator 2. The modulator 2 converts the electrical bit signal into an intensity modulation of the optical signal, so that an optical output signal of the NRZ type is generated.

FIG. 3 shows the return-to-zero (RZ) modulation method as an alternative possibility for modulating an optical signal. In the RZ method, the intensity of the optical signal between two subsequent "1"-pulses returns to zero, cf. FIG. 3a. Consequently, the pulse width is no longer equal to the full bit period T. The bandwidth of the optical spectrum of the RZ optical signal, represented in FIG. 3b, is broader than that of the NRZ optical signal of FIG. 2b. The most conventional way of generating an RZ signal is shown in FIG. 3c. First, a NRZ signal is generated in the way shown in FIG. 2c and then, the NRZ signal enters a second Mach-Zehnder modulator 3 to which a sinusoidal electrical signal is applied, thus generating a sinusoidal intensity modulation of the NRZ signal with an information frequency (in Hz) corresponding to the bit-rate B (in bit/s). As a result, the NRZ input signal to the second modulator 3 is converted into a RZ output signal.

At 40 Gb/s channel rate, numerous studies has shown that departing from the conventional modulation techniques described above, relying only on intensity modulation, is a powerful means to contain propagation impairments, and hence increase system margins. Among these impairments, intra-channel nonlinear effects are admittedly the most penalizing at 40 Gb/s.

When passed into a fiber link (inherently dispersive), any optical pulse within a given wavelength division multiplexing (WDM) channel is broadened and, should it be surrounded by neighboring pulses, tends to overlap them. As a result, pattern-dependent interactions occur. These interactions cannot be fully undone by pulse compression into a dispersion-compensating fiber, because they are nonlinear. They are usually referred to as nonlinear intrachannel effects.

Several modulation formats have been praised for their superior resistance to nonlinear effects when compared to conventional intensity modulated Return-to-Zero (RZ) and Non-Return-to-Zero (NRZ). One basic solution against intrachannel effects is to contain pulse broading due to dispersion, which can be obtained by combining intensity and phase modulation.

Carrier-Suppressed RZ (CSRZ), represented in FIG. 4, was proposed for that purpose. In this format, the phase of every bit of an RZ signal is rotated by π, see FIG. 4a (dashed line). The optical spectrum of the CSRZ signal is represented in FIG. 4b.

A conventional apparatus for generating a CSRZ signal is shown in FIG. 4c, similar to the one shown in FIG. 3c. In contrast to FIG. 3c, the sinusoidal signal driving the modulator is at half the information frequency, so that both frequency and phase of an NRZ input signal from the first modulator 2 are changed. Besides, the second Mach-Zehnder modulator 3 is preferably a dual-arm modulator, but not necessarily. In the two arm configuration, the same sinusoidal signal with half the frequency corresponding to the bit-rate B is applied to both arms. Though better than RZ, the CSRZ scheme is not very effective against intrachannel nonlinear effects.

Another solution consists in applying a sinusoidal phase to an RZ signal, to make chirped RZ (CRZ), but CRZ comes with an increased channel spectral bandwidth beyond what is acceptable for 40 Gb/s WDM applications.

Yet another method for the mitigation of intrachannel nonlinear effects is pair-wise alternate phase RZ (PAPRZ), represented in FIG. 5, which is basically similar to CSRZ, but with a π-phase rotation every second bit rather than every bit, see FIG. 5a for the phase rotation and FIG. 5b for the optical spectrum. A conventional apparatus for generating a PAPRZ signal is shown in FIG. 5c. The scheme includes the setup for generating an RZ signal shown in FIG. 3c, followed by a third modulator 4 for generating a phase-shift of every second bit of the RZ signal, to which a square-like clock signal with a frequency equal to one fourth of the information frequency B is applied. The PAPRZ scheme is much more efficient against intra-channel effects than CSRZ but has the drawback that three modulators 2, 3, 4 are required.

Other approaches for rotating the phase of the optical signal in a more random (pattern-dependent) manner exist, e.g. the differential-phase shift keying (DPSK) family, namely Return-to-Zero DPSK or NRZ-DPSK. The drawback of the DPSK family modulation techniques is that an electrical pre-coder, a temperature-stabilized Mach-Zehnder differential decoder and a balanced receiver are required. Another method of pattern-dependent phase shifting is the so-called phase shaped binary transmission (PSBT), for the application of which an electrical pre-coder and a careful control of the RF signal chain are required.

SUMMARY OF THE INVENTION

It is the object of the invention to provide a modulation method particularly efficient against nonlinear intrachannel effects and an optical transmitter for performing the method.

This object is achieved by a method as described above wherein the intensity of the optical signal is modulated with a nonreturn-to-zero bit signal, and the phase of the optical signal is modulated with a periodic phase-shift signal creating an alternating π-phase shift every second, third or more consecutive bit.

All of the solutions described above are either not as performing or require more expensive generation techniques than the invention. The inventive method combines most of the superior resistance of the PAPRZ method to intrachannel effects with the relative simplicity of the CSRZ method.

It is obvious for those skilled in the art that the order of the steps of the inventive method may be reversed, i.e. the inventive method may also be performed by first modulating the phase of the optical signal with a π-phase shift every second, third, . . . bit and then modulating the intensity of the optical signal with a nonreturn-to-zero bit signal.

In a preferred variant the phase-shift signal creates an alternating π-phase shift every second consecutive bit, thus generating a pair-wise alternate phase non-return to zero (PAPNRZ) optical signal. The PAPNRZ modulation scheme is particularly advantageous in that the complexity of the PAPNRZ generation scheme is similar to that of RZ and CSRZ formats, but lower than that of the PAPRZ format. The PAPNRZ spectrum is almost as narrow as that of NRZ, which suggests that high spectral densities applications are achievable (larger than 0.4 bit/s/Hz, upper limit to be defined).The intensity of the waveform of the PAPNRZ optical signal lies between the intensity of a NRZ signal and a RZ signal.

The invention is also realized in an optical transmitter for performing the above method, comprising a first modulator modulating the intensity of the optical signal with a nonreturn-to-zero bit signal, and a second modulator modulating the phase of the optical signal with a periodic phase-shift signal creating an alternating π-phase shift every second, third or more consecutive bit.

The modulation can be performed using only two cascaded modulators. The first modulator generates a NRZ optical signal out of a continuous optical signal and the second one provides π-phase alternation to consecutive bits of the signal. The optical signal may first pass through the first modulator and then through the second modulator or vice versa.

In a highly preferred embodiment the second modulator modulates the phase of the optical signal with a phase-shift signal creating an alternating n-phase shift every second consecutive bit. The PAPNRZ modulated signal generated in this way has the advantageous properties mentioned above.

In another embodiment the first modulator is fed with a nonreturn-to-zero electrical bit signal at the bit-rate. The bit-rate B for a 40 Gbit/s transmission of information data is 43 Gbit/s, if the most conventional forward error correction (FEC) overhead is included.

In a further preferred embodiment the second modulator is clocked with at least one square-like phase-shift signal at one fourth of the information frequency. For a transmission of 40 Gbit/s, the information frequency of the phase-shift signal is 40 GHz/4=10 GHz (FEC not included).

In another embodiment a continuous light source, in particular a laser source, supplies the optical signal. The laser source generates a continuous wave optical signal serving as a carrier signal.

In a further preferred embodiment the first and/or the second modulator are of the Mach-Zehnder type, a type which is advantageously used in high bit-rate applications.

In a highly preferred embodiment the second modulator is a dual-arm Mach-Zehnder modulator. The dual-arm Mach-Zehnder modulator has basically the same transfer function as a single-arm modulator, but the required voltage swing is twice as small (because it is split in two). The dual-arm approach is most useful when electronics is not mature enough to provide a high enough voltage with good properties, e.g. at bit rates of about 40 Gb/s at the present day.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

DETAILED DESCRIPTION OF THE INVENTION

Figure 1A:
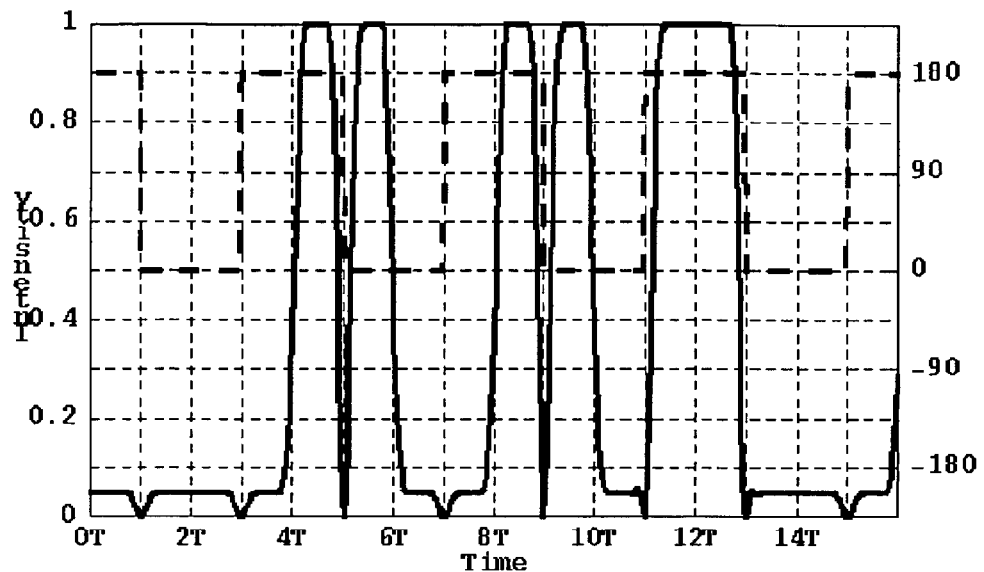
FIGS. 1a-1c shows the a typical 16-bit intensity/phase waveform (FIG. 1a) and the optical spectrum (FIG. 1b) of a pair-wise alternate phase nonreturn-to-zero (PAPNRZ) optical signal generated according to one variant of the inventive method, as well as a schematic of an embodiment of the optical transmitter according to the invention (FIG. 1c)
Figure 1B:
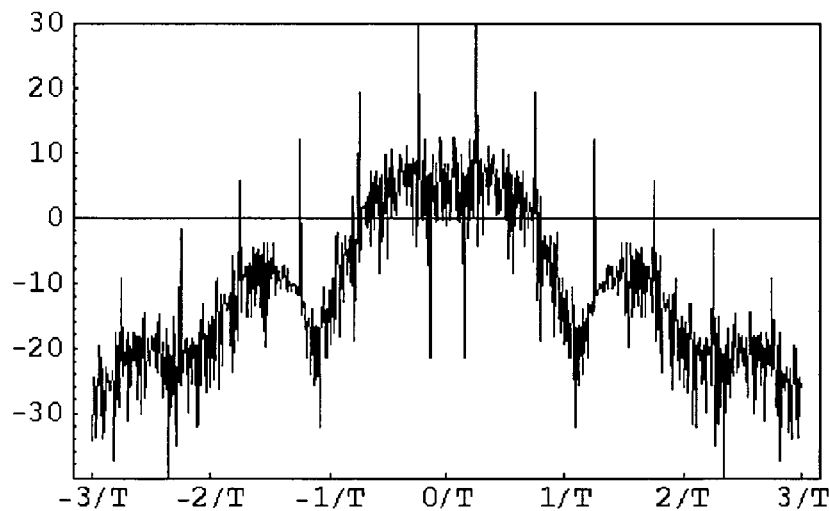
Figure 1C:
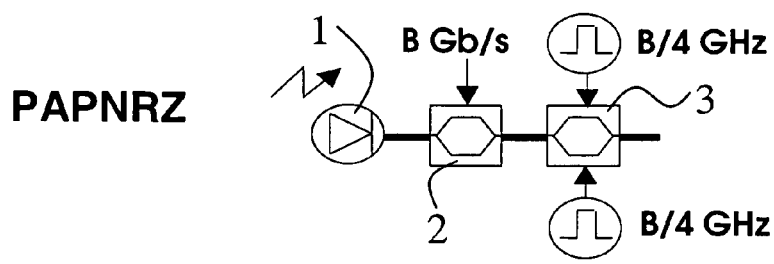
Figure 2A:
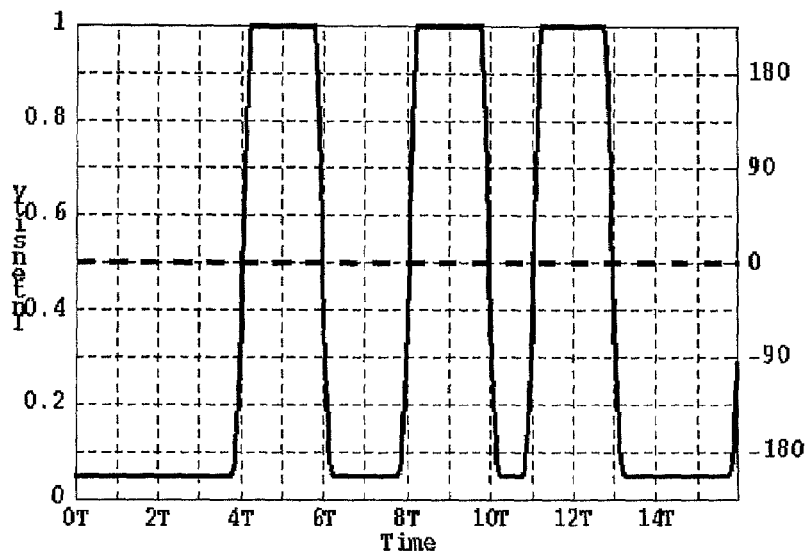
FIGS. 2a-2c shows an analogous representation for a non-return-to-zero (NRZ) optical signal.
Figure 2B:
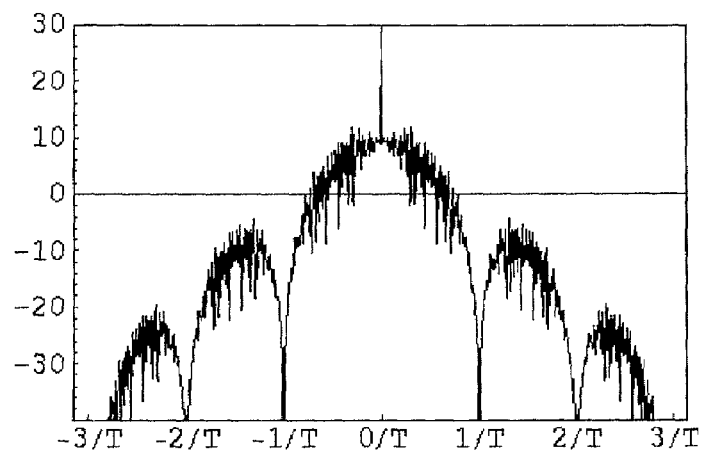
Figure 2C:
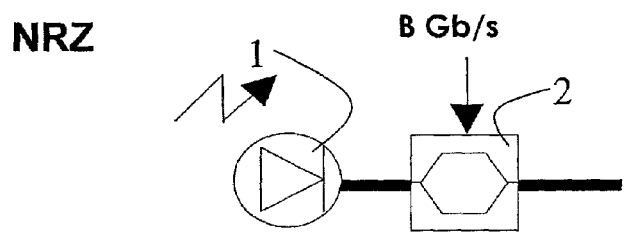
Figure 3A:
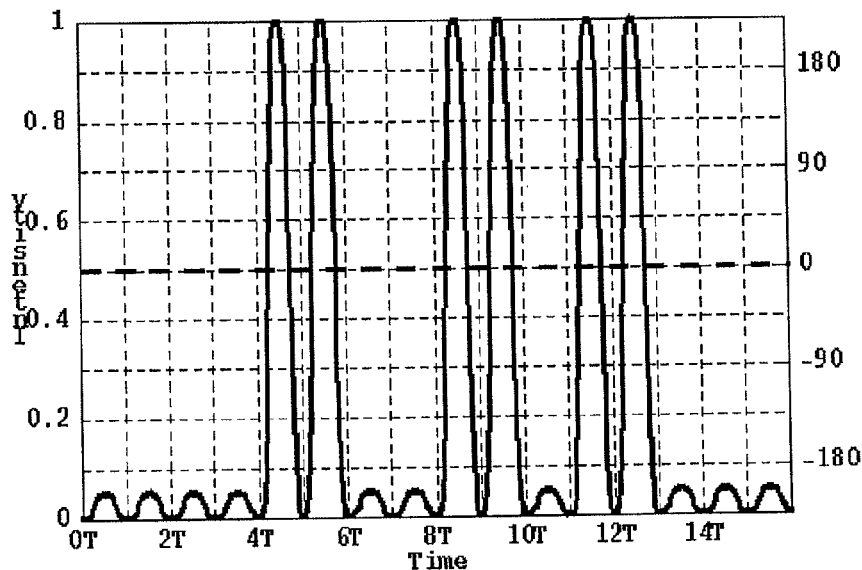
FIGS. 3a-3c shows an analogous representation for a return-to-zero (RZ) optical signal.
Figure 3B:
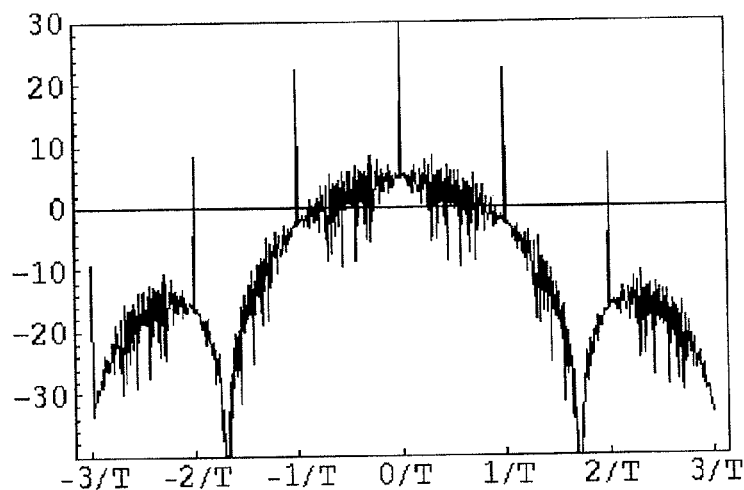
Figure 3C:
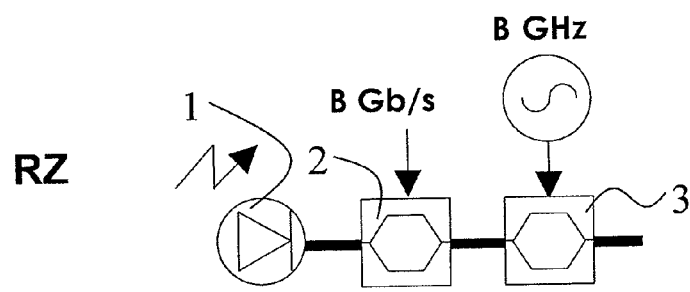
Figure 4A:
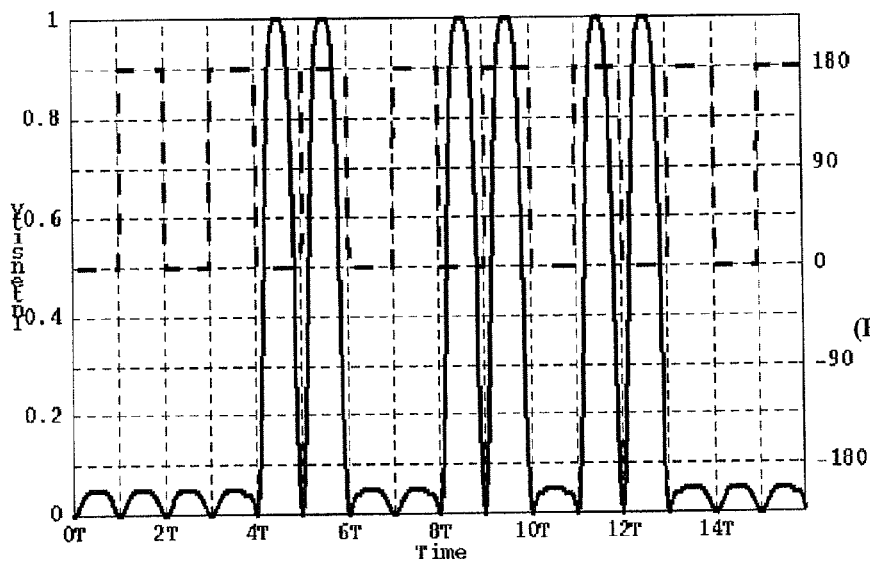
FIGS. 4a-4c shows an analogous representation for a carrier-suppressed return-to-zero (CSRZ) optical signal.
Figure 4B:
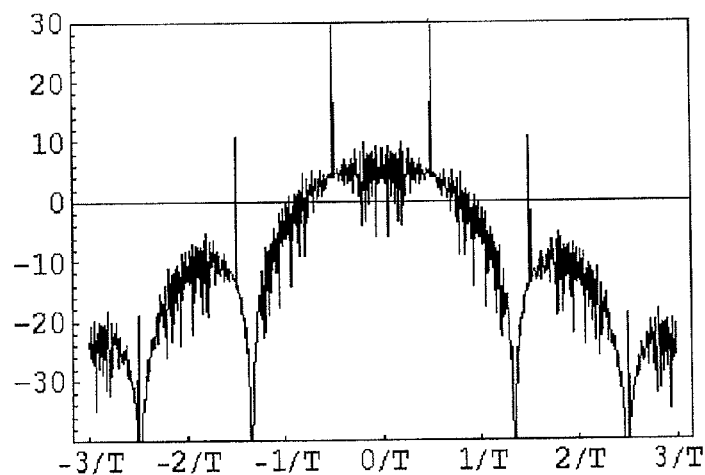
Figure 4C:
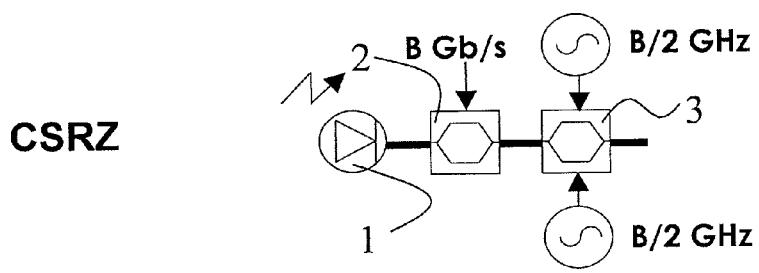
Figure 5A:
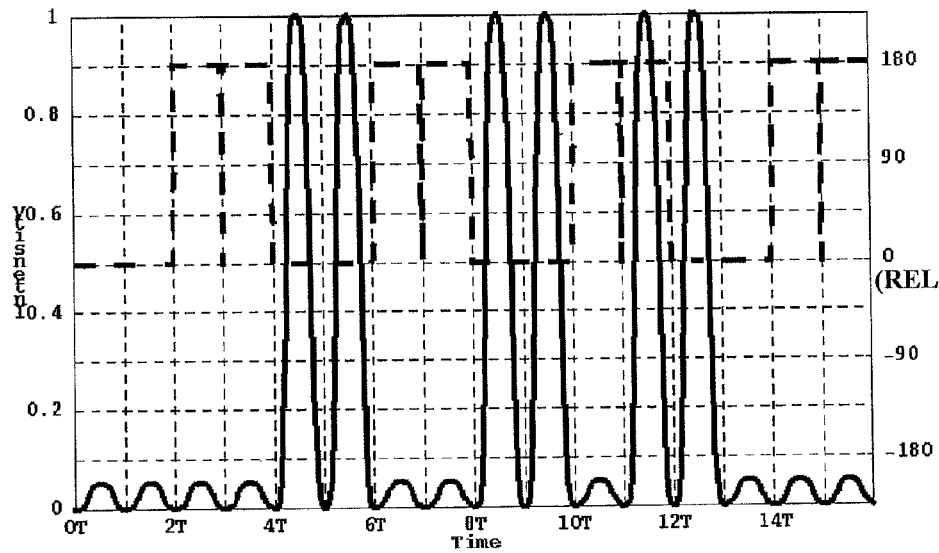
FIGS. 5a-5c shows an analogous representation for a pair-wise alternate phase return-to-zero (PAPRZ) optical signal.
Figure 5B:
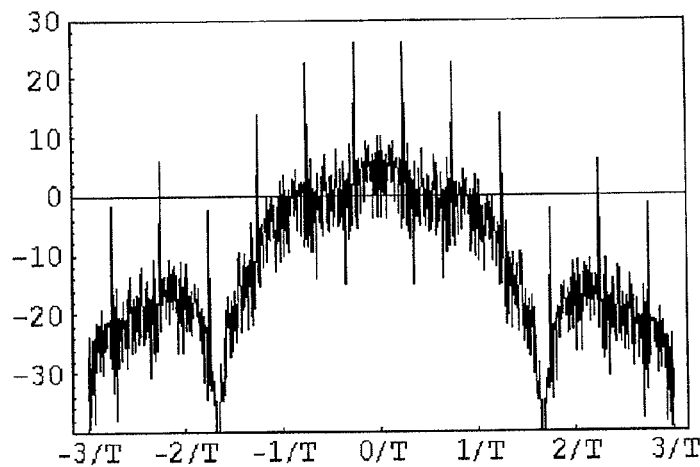
Figure 5C:
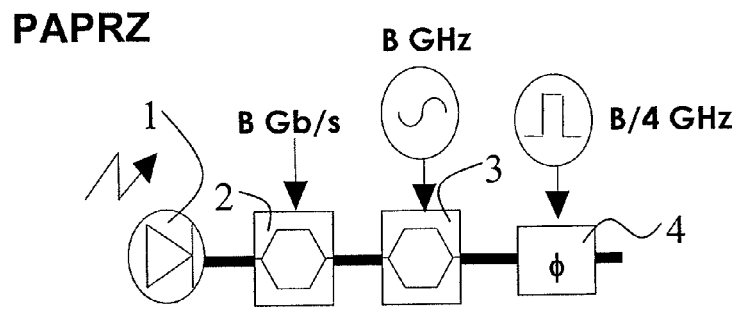

FIG. 1c shows an optical transmitter comprising a laser source 1 followed by a first and a second Mach-Zehnder modulator 2, 3. The laser source 1 generates a continuous wave optical signal whose intensity is modulated in the first Mach-Zehnder modulator 2 with an electrical non-return-to-zero (NRZ) bit signal having a bit-rate of B=40 Gbit/s (FEC not included) corresponding to the bit-rate of a subsequent transmission line (not shown). The output signal of the first modulator 2 is the NRZ optical signal shown in FIG. 2a. The NRZ optical signal serves as an input to the second, dual-arm Mach-Zehnder modulator 3. The second modulator 3 modulates the phase of the NRZ optical signal by generating an alternating π-phase shift every second consecutive bit of the NRZ optical signal. Between consecutive pairs of bits, a phase jump of ±π is performed, so that consecutive pairs of bits show an alternating phase sequence of 0, π, 0, π etc. The phase-shift is generated by clocking both arms of the second Mach-Zehnder modulator 3 with a clock signal with a frequency equal to one fourth of the information frequency B (i.e. 40/4=10 GHz, FEC not included). The output signal thus generated in the second Mach-Zehnder modulator 3 is a pair-wise alternate phase nonreturn-to-zero (PAPNRZ) optical signal.

The first Mach-Zehnder modulator 2 of FIG. 1c is assumed to be chirp-free. The second Mach-Zehnder modulator 3 of FIG. 1c is a dual-arm modulator with a total driving voltage of $2 V_\pi$, regardless of the actual Mach-Zehnder design (single or dual-arm configuration). Of course, the generation scheme for PAPNRZ signals shown in FIG. 1c is only one of several possible generation schemes for this format. Alternatively, it is possible to perform a π-phase shift only every third, fourth, etc. consecutive bit.

The properties of the PAPNRZ signal generated in the way described above are shown in FIG. 1a and FIG. 1b. The intensity of the waveform of the PAPNRZ optical signal lies in between the intensity of a NRZ signal and a RZ signal. The PAPNRZ spectrum is almost as narrow as that of NRZ, which suggests that high spectral densitiy applications are achievable The performance of the PAPNRZ scheme is compared to other schemes in FIG. 6, showing the computed Q factor (in dB) after 1500 km over a single-mode fiber (SMF) of a PAPNRZ, NRZ, RZ, and CSRZ optical signal (pre-compensation and post-compensation optimized, in-line per-span compensation ratio=97%) as a function of power at the fiber input (in dBm) (both noise and nonlinear effects are taken into account).

It can be seen that the optimum power for a PAPNRZ signal is ~2 dB higher than that of a NRZ, RZ and CSRZ signal, which illustrates the superior resistance of the PAPNRZ format to nonlinear effects. This feature translates into a Q factor margin enhanced by more than 1 dB with respect to RZ and CSRZ formats, and 1.5 dB with respect to the NRZ format.

Figure 6:
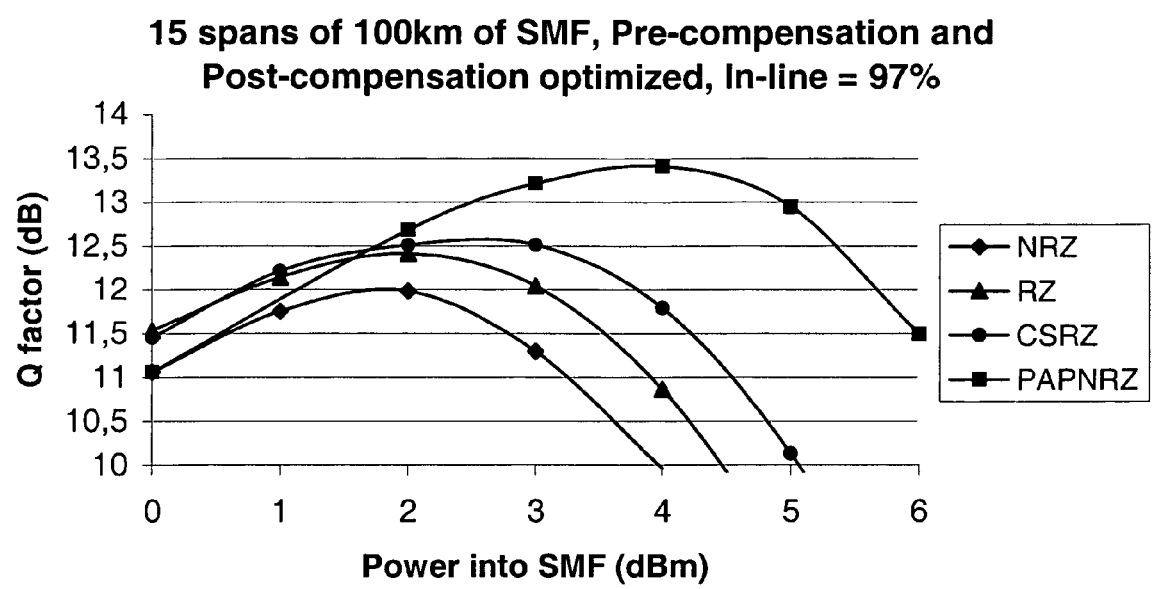
FIG. 6 shows four plots of the Q factor versus the input power of optical signals generated with the PAPNRZ, the NRZ, the RZ, and the CSRZ modulation method.

In each case, the propagation of only a single channel of a WDM signal is simulated in FIG. 6. However, numerous studies have shown that WDM nonlinear crosstalk is negligible at 40 Gb/s, which leads to the conclusion that the curves of FIG. 6 are readily applicable to a WDM environment.

The invention claimed is:

1. A method for modulating an optical signal, the method comprising:
    first modulating an intensity of the optical signal with a nonreturn-to-zero bit signal; and
    second modulating with a Mach-Zender modulator a phase of the optical signal with an alternating $\pi$-phase shift every second, third or more consecutive bit using a periodic phase-shift signal, so as to generate an output optical signal comprising the alternating $\pi$-phase shift modulation and a nonreturn-to-zero modulated intensity,
    wherein an intensity of the output optical signal between two consecutive "1" bits does not return to zero except at bit transitions where the $\pi$-phase shift is performed.

2. The method according to claim 1, wherein by the second modulating, the phase of the optical signal is changed with an alternating $\pi$-phase shift every second consecutive bit.

3. The method according to claim 1, wherein the alternating $\pi$-phase shift every second, third or more consecutive bit is performed such that phase jumps of $+\pi$ and $-\pi$ are alternated after every two, three or more consecutive bits.

4. An optical transmitter for modulating an optical signal, comprising:
    a first modulator modulating an intensity of the optical signal with a nonreturn-to-zero bit signal; and
    a second modulator modulating a phase of the optical signal with an alternating $\pi$-phase shift every second, third or more consecutive bit using a periodic phase-shift signal, so as to generate an output optical signal comprising the alternating $\pi$-phase shift modulation and a nonreturn-to-zero modulated intensity,
    wherein an intensity of the output optical signal between two consecutive "1" bits does not return to zero except at bit transitions where the $\pi$-phase shift is performed.

5. The optical transmitter according to claim 4, wherein the second modulator modulates the optical signal with an alternating $\pi$-phase shift every second consecutive bit.

6. The optical transmitter according to claim 4, wherein the first modulator is fed with a nonreturn-to-zero electrical bit signal at the information frequency.

7. The optical transmitter according to claim 4, wherein the second modulator is clocked with at least one square-like phase-shift signal at one fourth of the information frequency.

8. The optical transmitter according to claim 4, wherein a continuous light source, in particular a laser source, supplying the optical signal.

9. The optical transmitter according to claim 4, wherein the first modulator is of the Mach-Zehnder type.

10. The optical transmitter according to claim 9, wherein the second modulator is a dual-arm Mach-Zehnder modulator.

11. The optical transmitter according to claim 4, wherein the alternating $\pi$-phase shift every second, third or more consecutive bit is performed such that phase jumps of $+\pi$ and $-\pi$ are alternated after every two, three or more consecutive bits.

* * * * *

UNITED STATES PATENT AND TRADEMARK OFFICE
CERTIFICATE OF CORRECTION

PATENT NO. : 7,599,628 B2  Page 1 of 1
APPLICATION NO. : 11/300474
DATED : October 6, 2009
INVENTOR(S) : Bigo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 687 days.

Signed and Sealed this

Twenty-eighth Day of September, 2010

David J. Kappos
*Director of the United States Patent and Trademark Office*